United States Patent
Reiner et al.

(10) Patent No.: US 9,141,908 B1
(45) Date of Patent: Sep. 22, 2015

(54) DYNAMIC INFORMATION ASSEMBLY FOR DESIGNATED PURPOSE BASED ON SUITABILITY REASONING OVER METADATA

(75) Inventors: David Stephen Reiner, Lexington, MA (US); Nihar Nanda, Acton, MA (US); John Daniel Hushon, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 337 days.

(21) Appl. No.: 13/538,219

(22) Filed: Jun. 29, 2012

(51) Int. Cl.
*G06N 5/02* (2006.01)

(52) U.S. Cl.
CPC ........................................ *G06N 5/02* (2013.01)

(58) Field of Classification Search
None
See application file for complete search history.

(56) References Cited

U.S. PATENT DOCUMENTS

| | | | |
|---|---|---|---|
| 6,374,079 B1 * | 4/2002 | Hsu | 455/11.1 |
| 7,440,934 B2 | 10/2008 | Kuelzow | |
| 8,443,157 B1 | 5/2013 | Reiner | |
| 8,468,241 B1 | 6/2013 | Raizen | |
| 8,725,869 B1 | 5/2014 | Reiner | |
| 8,762,374 B1 | 6/2014 | Chen | |
| 8,838,556 B1 | 9/2014 | Reiner | |
| 2008/0040308 A1 * | 2/2008 | Ranganathan et al. | 707/1 |
| 2008/0208814 A1 * | 8/2008 | Friedlander et al. | 707/3 |
| 2009/0070322 A1 * | 3/2009 | Salvetti et al. | 707/5 |
| 2009/0138415 A1 * | 5/2009 | Lancaster | 706/11 |
| 2009/0282405 A1 * | 11/2009 | Moir et al. | 718/100 |
| 2010/0005122 A1 * | 1/2010 | Jackson | 707/104.1 |
| 2010/0017403 A1 * | 1/2010 | Merrigan et al. | 707/5 |
| 2010/0070448 A1 * | 3/2010 | Omoigui | 706/47 |
| 2010/0324927 A1 * | 12/2010 | Tinsley | 705/2 |
| 2012/0179684 A1 * | 7/2012 | Alba et al. | 707/738 |
| 2012/0191716 A1 * | 7/2012 | Omoigui | 707/740 |

OTHER PUBLICATIONS

Tankeleviciene et al, "Characteristics of Domain Ontologies for Web Based Learning and their Application for Quality Evaluation", Informatics in Education, 2009, vol. 8, No. 1, 131-152 1312009 Institute of Mathematics and Informatics, Vilnius.*
W3C OWL Working Group, "OWL 2 Web Ontology Language Document Overview," W3C Recommendation, Oct. 2009, 12 pages.
U.S. Appl. No. 13/336,613, filed in the name of D.S. Reiner et al. on Dec. 23, 2011 and entitled "Managing Data Sets by Reasoning Over Captured Metadata."

* cited by examiner

*Primary Examiner* — Jeffrey A Gaffin
*Assistant Examiner* — Ilya Traktovenko
(74) *Attorney, Agent, or Firm* — Ryan, Mason & Lewis, LLP (57) ABSTRACT

A reasoning system is configured to interact with data processing elements of an information processing system. The reasoning system includes a reasoning module configured to perform one or more reasoning operations on metadata. The metadata characterizes data sets associated with the data processing elements in order to identify at least selected portions of one or more of the data sets as being suitable for use in achieving a designated purpose. The reasoning system also includes a dynamic information assembly module configured to utilize results of the one or more reasoning operations to assemble at least a subset of the selected portions so as to achieve the designated purpose. The reasoning system and associated data processing elements may be implemented, by way of example, in cloud infrastructure of a cloud service provider, or on another type of processing platform.

22 Claims, 5 Drawing Sheets

```
PREFIX dso: <http://ip-address/Data_Set_Ontology/2011/dataset/>
SELECT ?Process ?ProcessName ?Task ?TaskName ?AutomatedAgent ?SuitabilityRule
  ?SuitabiltyConstraint ?NextTask ?Role ?DataSet ?Alias ?RoleTypeID
WHERE {
  ?Process a dso:Process.
  ?Process dso:hasTask ?Task.

?Process dso:processName ?ProcessName.
  ?Task dso:nextTask ?NextTask.
  ?Task dso:taskDescription ?TaskName.
  ?Task dso:hasAutomatedAgent ?AutomatedAgent
  ?Task dso:hasSuitabilityRule ?SuitabilityRule
  ?Task dso:hasSuitabilityConstraint ?SuitabilityConstraint
  ?Role dso:hasTask ?Task.
  ?Role dso:hasRoleTypeId ?RoleTypeID.
  ?Role dso:hasDataSet ?DataSet.
  ?DataSet dso:hasAlias ?alias.
  FILTER( ?Process =
  "http://ip-address/Data_Set_Ontology/2011/dataset/instances#Process-10001")
}
```

DYNAMIC INFORMATION ASSEMBLY FOR DESIGNATED PURPOSE BASED ON SUITABILITY REASONING OVER METADATA

FIELD

The field relates generally to information processing systems, and more particularly to processing techniques utilized within such systems.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

In cloud-based information processing system arrangements of the type described above, a wide variety of different hardware and software products are often deployed, many of which may be from different vendors, resulting in a complex system configuration. As the complexity of such cloud infrastructure increases, the need for accurate and efficient processing of data has also grown.

Existing approaches to information assembly take an inflexible approach to handling associated processes. For example, such approaches generally do not consider issues of data set provenance, versioning, volatility, derivation, indexing, materialization, and state, with respect to their process implications and remediation of issues. Assertions, rules and constraints governing processes are generally neither visible nor assessable.

From an information assembly perspective, there is no unified description or repository for metadata on data sets, no explicit representation of such metadata that allows reasoning or recommendations, and no easy way to assess assertions about data sets used in information assembly for purpose. This combination limits the actions that can be taken, causes process errors, and raises doubts about the validity of process outcomes. Former approaches may make optimistic assumptions in some cases ("let's assume the usual information was fine") and pessimistic ones in other cases ("there's an input file missing, so let's abort the process"). Such assumptions may be inaccurate and can substantially undermine system performance when carrying out a variety of different processing operations.

SUMMARY

Illustrative embodiments of the present invention provide techniques for dynamic information assembly for a given designated purpose based on suitability reasoning over metadata.

In one embodiment, a reasoning system is configured to interact with data processing elements of an information processing system. The reasoning system comprises a reasoning module configured to perform one or more reasoning operations on metadata characterizing data sets associated with said data processing elements in order to identify at least selected portions of one or more of the data sets as being suitable for use in achieving a designated purpose, and a dynamic information assembly module configured to utilize results of the one or more reasoning operations to assemble at least a subset of the selected portions so as to achieve the designated purpose.

The reasoning system and associated data processing elements may be implemented, by way of example, in cloud infrastructure of a cloud service provider, or on another type of processing platform.

One or more of the illustrative embodiments advantageously overcome the above-noted drawbacks of conventional approaches. For example, by applying semantic reasoning based on data set metadata to the determination of suitability of data sets for a designated purpose, associated processes can be implemented in a fundamentally correct way, and at substantially higher efficiency, lower cost and greater accuracy than would otherwise be possible, leading to improved operational performance in information processing systems. Also, interoperability of data processing in multiple environments is facilitated.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
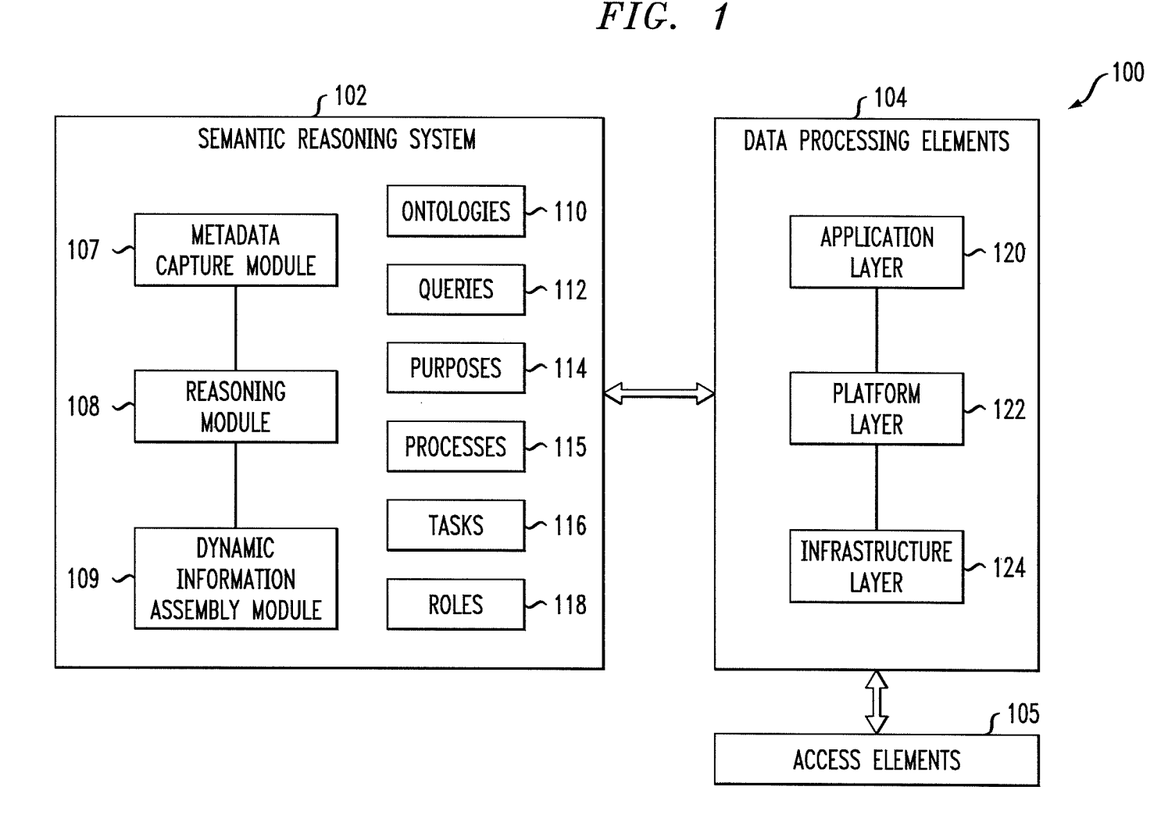
FIG. 1 is a block diagram of an information processing system having a semantic reasoning system in an illustrative embodiment of the invention.

FIG. 1 shows an information processing system 100 configured in accordance with an illustrative embodiment of the present invention. The information processing system 100 comprises a semantic reasoning system 102 in communication with data processing elements 104 implemented in IT infrastructure of the system 100. One or more of the data processing elements 104 are accessible to external entities via access elements 105. For example, in a cloud-based system embodiment in which the data processing elements comprise elements of cloud infrastructure of the system, external devices such as tenant terminals may access the data processing elements 104 via the access elements 105. The access elements may comprise one or more networks as well as associated interface devices.

The semantic reasoning system 102 in the present embodiment is configured to perform reasoning operations using metadata characterizing data sets associated with the data processing elements 104, in order to determine suitability of the data sets or portions thereof for use in achieving a designated purpose, and to assemble information from the suitable data sets in a dynamic manner so as to achieve the designated purpose.

A "data set" as the term is used herein may be viewed as an abstraction of one or more data items, such as a table, document, file, query result, key-value pairs, index, storage block contents, in-memory caches or other data item or combinations thereof, where the given data set is characterized by properties as well as relationships to other data sets. These properties and relationships are captured by metadata that is associated with the data set in the system 100.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata," which is commonly assigned herewith and incorporated by reference herein.

The semantic reasoning system 102 comprises a metadata capture module 107, a reasoning module 108 and a dynamic information assembly module 109. The metadata capture module 107 is configured to obtain metadata characterizing data sets associated with the data processing elements 104. It should be noted that the term "capture" as used herein is intended to be broadly construed, so as to encompass, for example, any of a variety of techniques for accessing or otherwise obtaining metadata, including, as one possible example, capturing metadata in a common store.

As will be described in conjunction with FIG. 3 below, the metadata characterizes properties of the data sets and relationships among the data sets, as well as other relationships such as relationships among processes, tasks, roles, agents and data sets, and may be defined in accordance with a specified semantic ontology.

The reasoning module 108 is configured to perform one or more reasoning operations on the metadata in order to identify at least selected portions of one or more of the data sets as being suitable for use in achieving a designated purpose. The dynamic information assembly module 109 is configured to utilize results of the one or more reasoning operations to assemble at least a subset of the selected portions so as to achieve the designated purpose. The semantic reasoning system 102 may communicate with one or more of the data processing elements 104 via a conventional network connection or other suitable interface.

It should be noted that the term "designated purpose" as used herein is intended to be broadly construed, and may be associated with, for example, a particular process, task or role that is itself part of a high-level business purpose. In other embodiments, the term may instead refer to the high-level business purpose.

Also included in the semantic reasoning system 102 in the present embodiment are ontologies 110, queries 112, purposes 114, processes 115, tasks 116 and roles 118, at least portions of which are accessible to and utilized by one or more of the modules 107, 108 and 109. Examples of a semantic ontology and an associated query will be described in more detail below in conjunction with FIGS. 3 and 4, respectively.

The data processing elements 104 may be viewed as being arranged in layers including an application layer 120, a platform layer 122 and an infrastructure layer 124. For example, these layers may be used to provide respective SaaS, PaaS and IaaS cloud services in an embodiment in which data processing elements 104 comprise cloud infrastructure. Such cloud infrastructure may be viewed as comprising physical infrastructure and associated virtualization infrastructure running on the physical infrastructure.

It is to be appreciated, however, that embodiments of the invention can be implemented without the use of cloud infrastructure. For example, the semantic reasoning system 102 and data processing elements 104 may be part of an enterprise storage network or other IT infrastructure associated with a single enterprise. The processing elements 104 may therefore be associated with any type of IT infrastructure.

The semantic reasoning system 102 and the data processing elements 104 may be implemented on a common processing platform or on separate processing platforms. Examples of processing platforms suitable for implementing at least a portion of these and other elements of system 100 will be described below in conjunction with FIGS. 6 and 7. A given such processing platform comprises at least one processing device comprising a processor coupled to a memory, and the processing device may be implemented at least in part utilizing a virtual machine, although other embodiments need not utilize any virtualization.

Also, although shown in FIG. 1 as being separate from the data processing elements 104, at least a portion of one or more of the semantic reasoning system 102 and the access elements 105 may be implemented within one or more of the data processing elements 104. It is also to be understood that a given embodiment of the system 100 may include multiple instances of the semantic reasoning system 102, although only a single instance of the semantic reasoning system is shown in the system diagram for clarity and simplicity of illustration.

Figure 2:
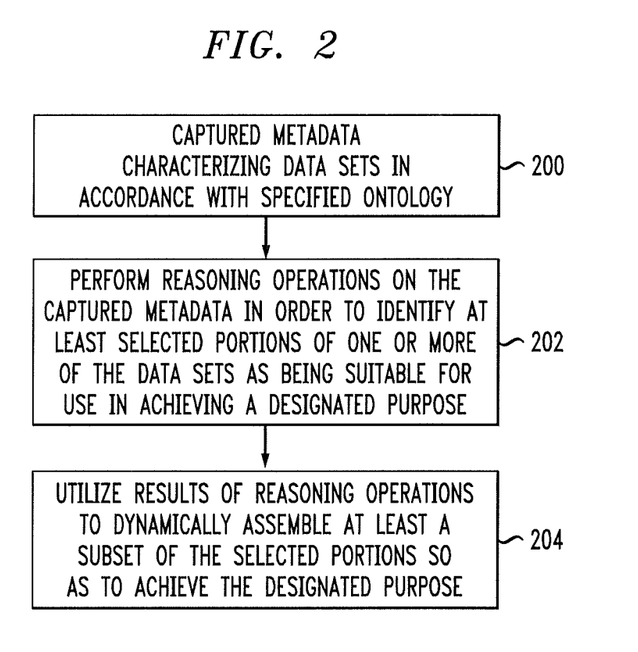
FIG. 2 is a flow diagram illustrating a dynamic information assembly process implemented in the FIG. 1 system.

It should be understood that the particular sets of modules and other components implemented in the system 100 as illustrated in FIGS. 1 and 2 are presented by way of example only. In other embodiments, only subsets of these components, or additional or alternative sets of components, may be used, and such components may exhibit alternative functionality and configurations.

For example, although characterized in the FIG. 1 system as comprising a semantic reasoning system, in other embodiments the system 100 may implement other types of reasoning systems that do not rely on semantics. Such alternative reasoning systems may be configured to utilize metadata representations that are not ontologies.

The operation of the system 100 will now be described in greater detail with reference to the flow diagram of FIG. 2, which shows a set of operations performed by the semantic reasoning system 102 in an illustrative embodiment. The process as shown includes steps 200 through 206.

In step 200, metadata characterizing data sets associated with the data processing elements 104 is captured by the metadata capture module 107 in accordance with one or more of the ontologies 110 supported by the semantic reasoning system 102. A detailed example of an ontology is shown in FIG. 3. The capture of metadata in step 200 may involve use of one or more queries 112 that are particularly adapted to capture metadata. Other types of queries 112 may be used in other steps of the FIG. 2 process. For example, the SPARQL query of FIG. 4 may be used as part of a given reasoning operation to identify a subset of previously-captured metadata.

In step 202, reasoning operations are performed on the captured metadata by the reasoning module 108 in order to identify at least selected portions of one or more of the data sets as being suitable for use in achieving a designated purpose selected from the purposes 114 supported by the semantic reasoning system 102. As indicated above, SPARQL queries or other types of queries may be utilized to identify relevant metadata in conjunction with performance of at least one reasoning operation.

In step 204, results of the reasoning operations are utilized to dynamically assemble at least a subset of the selected portions of the one or more data sets so as to achieve the designated purpose. As noted above, the designated purpose referred to in the context of the FIG. 2 process and elsewhere herein may be associated with, for example, a particular process, task or role that is itself part of a high-level business purpose. As a more particular example, a given high-level business purpose may be to develop a new analytic model, and a task associated with achieving that business purpose may be gathering a training set for use in developing the analytic model. In this example, the designated purpose may be the purpose of the particular task, rather than the high-level business purpose. However, in other examples, the designated purpose may refer to the high-level business purpose.

The process as illustrated in FIG. 2 may be repeated serially for each of a plurality of semantic reasoning applications, or multiple instances of the process may be performed at least in part in parallel for multiple semantic reasoning applications. Also, the process may be repeated for each of a plurality of designated purposes associated with a given high-level business purpose.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing dynamic information assembly based on suitability reasoning over metadata in system 100. For example, the ordering of the process steps may be varied in other embodiments, or certain steps may be performed concurrently with one another rather than serially. Also, as indicated above, one or more of the process steps may be repeated periodically for a given application, or performed in parallel for the given application or multiple applications.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

Figure 3:
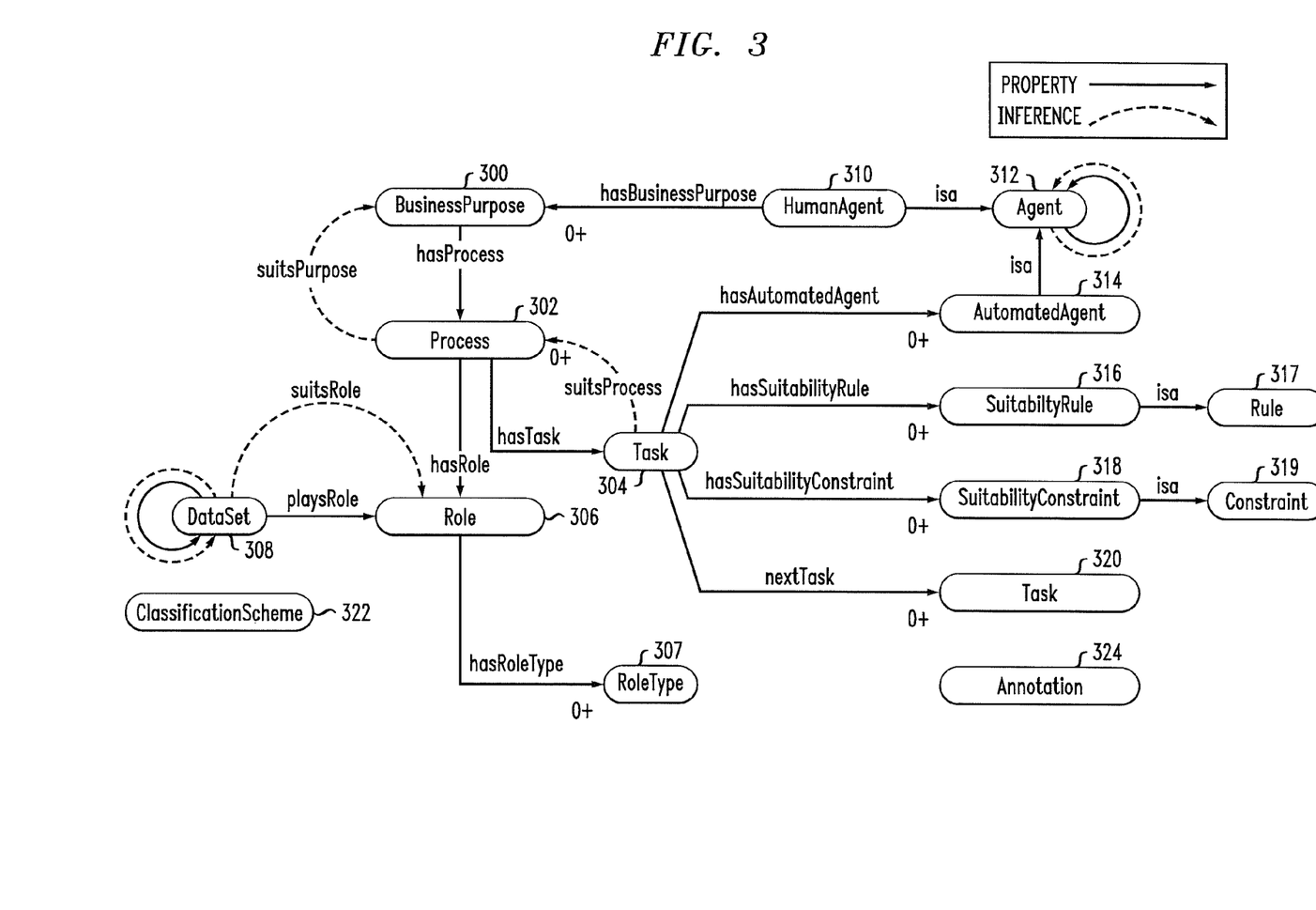
FIG. 3 shows one example of a semantic ontology that is utilized in an illustrative embodiment of the present invention.

FIG. 3 shows an example of a semantic ontology that represents one of the ontologies 110 utilized in the semantic reasoning system 102. The semantic ontology as shown includes a plurality of elements, with inter-element relationships based on properties being indicated by solid arrows and inter-element relationships based on inferences being indicated by dashed arrows.

In this exemplary semantic ontology, a high-level business purpose 300 has an associated process 302 that is suitable for the purpose. The process 302 has a task 304 and a role 306. The task 304 is suitable for the process 302. The role 306 is played by a data set 308 that is suitable for that role. It should be noted that the semantic ontology of FIG. 3 supports relationships by property and inference between different data sets (e.g., data set Y is a later version of data set X). The data set 308 may be viewed as a data set chosen as suitable, or even best suited, from multiple data sets.

A human agent 310 has the business purpose 300 and is an agent 312. As in the case of data sets, the semantic ontology of FIG. 3 also supports relationships by property and inference between different agents, and the agent 312 may be viewed as being chosen from multiple agents. The task 304 has an automated agent 314 that is also considered an agent 312. The task 304 also has a suitability rule 316 that is a rule 317, a suitability constraint 318 that is a constraint 319, and a next task 320. The FIG. 3 ontology also includes a classification scheme 322 and annotation 324, which are applicable to each of the other elements of the ontology.

Ontological elements such as business purpose 300, process 302, task 304 and role 306 may be stored in or otherwise associated with respective components 114, 115, 116 and 118 of the semantic reasoning system 102.

A semantic ontology of the type shown in FIG. 3 may be generated using an ontology builder such as *Revelytix Knoodl* and a rules engine such as *Rex*. The ontology may be implemented at least in part using standardized languages such as Resource Description Framework (RDF) and Web Ontology Language (OWL).

RDF is a language defined by the World Wide Web Consortium (W3C) for representing information about resources in the web. It identifies such resources using Uniform Resource Identifiers (URIs) and models statements about the resources as a directed graph. A given such statement is represented by the elements (Subject, Predicate, Object), also referred to as an RDF triple. Additional details regarding RDF are described in the following W3C Recommendations, all dated Feb. 10, 2004 and incorporated by reference herein: RDF/XML Syntax Specification (Revised); RDF Vocabulary Description Language 1.0: RDF Schema; RDF: Concepts and Abstract Syntax; RDF Semantics; and RDF Test Cases. See also W3C Recommendation RDFa in XHTML: Syntax and Processing, Oct. 14, 2008, which is also incorporated by reference herein.

The OWL language is described in, for example, OWL 2 Web Ontology Language Document Overview, W3C Recommendation 27, October 2009, which is incorporated by reference herein. The OWL 2 Web Ontology Language is an ontology language for the Semantic Web. OWL 2 ontologies generally provide classes, properties, individuals, and data values and are stored as Semantic Web documents. OWL 2 ontologies can be used along with information written in RDF, and OWL 2 ontologies themselves are primarily exchanged as RDF documents. It is to be appreciated, however, that RDF or OWL are not requirements of any particular embodiment of the invention.

The specific elements, properties and inferences shown in the FIG. 3 ontology are presented by way of illustrative example only, and a wide variety of other types of ontologies may be processed in the system 110.

The reasoning module 108 of the semantic reasoning system 102 utilizes a semantic ontology such as that shown in FIG. 3 in order to perform one or more reasoning operations on metadata characterizing data sets. This allows the reasoning module to identify at least selected portions of one or more of the data sets as being suitable for use in achieving a designated purpose, so as to thereby facilitate dynamic information assembly for achieving the designated purpose.

For example, the reasoning module 108 may be configured to determine at least one process associated with a designated purpose, to identify a plurality of tasks associated with the process, with each such task being subject to at least one of a rule and a constraint, and to identify a plurality of roles associated with the process, wherein each such role is played by a corresponding one of the selected portions of the one or more data sets. The reasoning module in determining suitability of the selected portions of the one or more data sets for use in achieving the designated purpose may generate recommendation, forensics information or other types of output regarding one or more of the selected portions. Of course, these are only examples, and numerous other types of processing may be performed by the reasoning module 108 in other embodiments of the invention.

Figure 4:
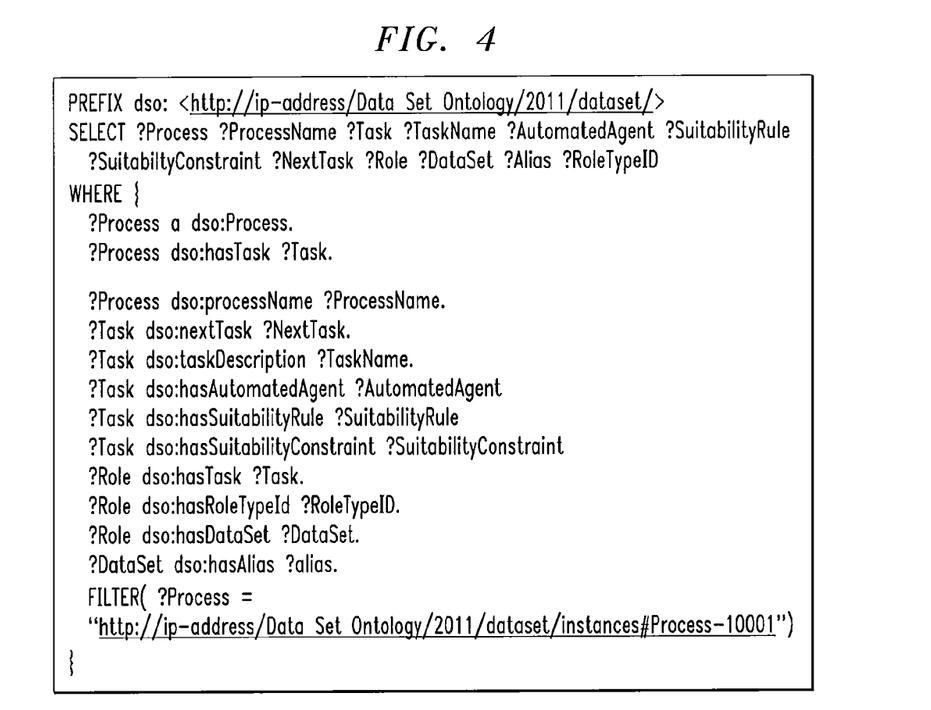
FIG. 4 illustrates a SPARQL query that is generated in accordance with the semantic ontology of FIG. 3

The semantic reasoning process for a given application may involve utilizing one or more queries 112 based on a semantic ontology of the type described above. Such queries may be configured in accordance with a query language such as SPARQL, which is an RDF query language described in, SPARQL Query Language for RDF, W3C Recommendation 15, January 2008, which is incorporated by reference herein. An example of a SPARQL query based on the FIG. 3 ontology is shown in FIG. 4. As noted above, this exemplary SPARQL query may be executed in conjunction with performance of at least one reasoning operation. It is to be appreciated, however, that other types of query languages may be used to generate queries 112 in the system 100, including Structured Query Language (SQL) and Object Query Language (OQL).

Figure 5:
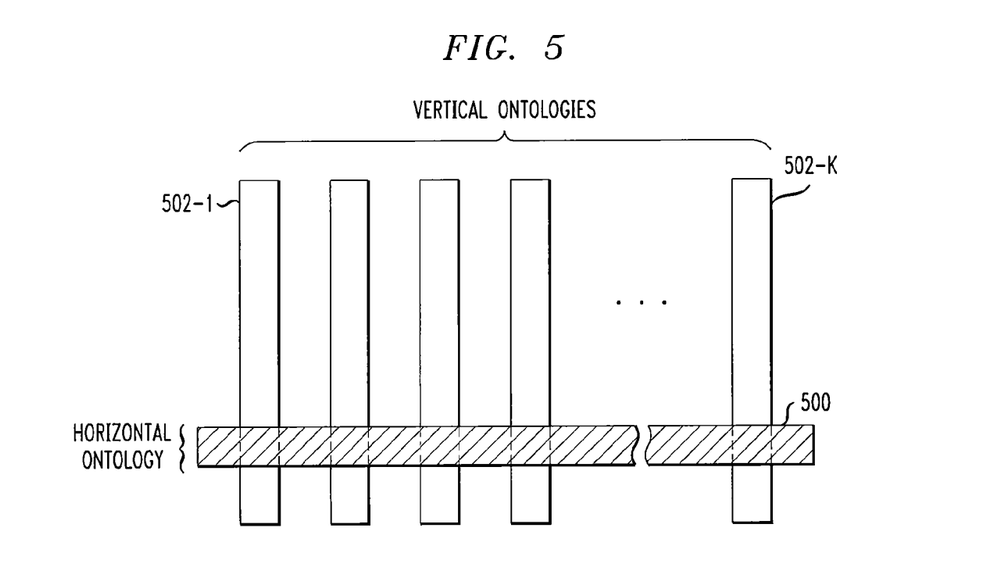
FIG. 5 is a diagram showing the relationship between horizontal and vertical ontologies.

As illustrated in FIG. 5, a given ontology 110 of semantic reasoning system 102 may be configured, for example, as a horizontal ontology 500 that leverages a plurality of vertical ontologies 502-1 through 502-K. The vertical ontologies 502 may represent existing ontologies associated with one or more applications, and the horizontal ontology may represent an additional ontology that benefits from previously-established definitions or classification schemes associated with the vertical ontologies. For example, classifications assigned to properties in horizontal schema are one possible use of a vertical ontology in the FIG. 5 arrangement.

The semantic reasoning system 102 in illustrative embodiments utilizes semantic ontologies such as that shown in FIG. 3 and SPARQL queries such as that shown in FIG. 4 to facilitate dynamic information assembly for achievement of designated purposes. For example, information can be assembled dynamically for a given purpose through manipulation and other processing of such data sets. By controlling dynamic information assembly based on results of semantic reasoning over the data sets, substantial performance improvements are obtained, for example, in terms of quality, flexibility (e.g., substituting a suitable data set for one that is currently unavailable), timeliness, compliance and relevance to the designated purpose.

One or more of the processes utilized in conjunction with the dynamic information assembly in a given embodiment of the invention may reside within an enterprise or across multiple enterprises, and may be within a private cloud, a public cloud, or a hybrid cloud. The processes may be applied to data sets from sources such as traditional databases, in-memory databases, data services, file systems and specialized data stores. Specialized data stores may include XML stores, key-value pair stores, object stores, indexes, multimedia stores (e.g., photos, video, audio, etc.).

Particular examples of processes utilized in conjunction with dynamic information assembly include extract-transform-load (ETL) processes and variants such as ELT and ETLT, reports against federated data sources, reports against a logical data warehouse, searches across heterogeneous data sets and stores, data set preparation for analysis (e.g., query, transform, normalize, sample, correlate, etc.), mash-ups based on common attributes of sources, processes that produce intermediate analytic results (e.g., MapReduce), view materialization, cube and facet generation, generation of an analytic model (e.g., clustering or segmentation, propensity to respond, pricing, inventory, etc.), recalibration or regeneration of an analytic model, backup and archiving processes, and business workflows (e.g., a business process management tool, an itinerary on an enterprise service bus, etc.)

Examples of questions that may be answered through the use of dynamic information assembly based on suitability reasoning in the semantic reasoning system 102 may include the following:

1. What is the preferred order of processing step execution to meet the objective purpose of the process?

2. What are the data sets needed for each processing step within the process?

3. Do the planned data sets meet the rules and constraints defined for each processing step, in areas such as freshness, version, provenance and location?

4. What is the impact on process results and analytic results of process modifications, such as data set substitution, with respect to process objectives?

5. Are appropriate controls in place to allow a query to be serviced?

6. Are the available versions of the data sets appropriate for use to achieve a particular purpose?

It should therefore be apparent that suitability reasoning over metadata as disclosed herein may be used to assist in a wide variety of different types of resolutions. Relationships between data sets in embodiments of the invention may be expressed in terms of types of associations that may hold between data sets. These associations may include versions, aggregations, partitions, filtered subsets, samples, anonymizations, transformations, etc. Context can be used to reason on such association types. For example, there may be multiple associations among a group of candidate data sets, and determining suitability of a given one of the candidate data sets for use in a context may require examining all or a subset of such associations linking the given data set to the other candidate data sets. Such determinations may also be made in arrangements in which a data set [A] is an aggregation of other data sets [B, C, D, . . . ] that may have had multiple associations among them.

The following are examples of use case scenarios that may be processed using the semantic reasoning system 102. Although these examples relate to applications in specific fields such as health care, financial services, and security event management, it is to be appreciated that the semantic reasoning system 102 can be applied in numerous other applications in a wide variety of other fields.

1. Updating a virtual patient health record. The use of dynamic information assembly based on suitability reasoning over metadata can avoid excess costs, delays and other inefficiencies associated with re-querying all associated data sets at access time. For example, alternative data sources may be substituted if certain information is unavailable, thereby assisting physicians that need to make decisions but do not have time to wait for the results of a lengthy or stalled process.

2. Determining if an intraday financial portfolio risk analysis is compliant with service level agreements or operational or security regulations. The semantic reasoning system can utilize properties and interrelationships of data sets subject to regulatory compliance, trading best practices, and contractual obligations in order to determine appropriate handling parameters.

3. Determining if particular data sets are suitable for financial benchmarking. Updating a financial benchmark requires extraction, transformation and derivation of the data acquired from multiple data sets. The use of dynamic information assembly based on suitability reasoning over metadata can avoid a situation in which unavailability of a relevant data set or use of an unsuitable data set may produce erroneous benchmarking results and thereby degrade trust in the process.

4. Selecting of an appropriate analytical algorithm. The semantic reasoning system can automatically compensate for unavailability of data sets to provide a seamless analytical interface to the users, such that the analytical algorithm can be selected based on the current state and availability of relevant data sets, which may span levels of granularity and fidelity. This use case may cut across several vertical ontologies in which data scientists choose to chain various types of statistical analytical processes together to arrive at a conclusion. Based on the current situation or the distribution of data sets, one form of an analytical model may be chosen over another.

5. Preventing system failures through data set state management. The growing dependency on data acquired from multiple sources, both internal and external, requires operational control to be active and to respond quickly to deviations from customary processes. Once an issue is identified, the operational control may choose the appropriate remedies to prevent further propagation of problems to downstream processes.

6. Assessing security breaches. The semantic reasoning system can be used to determine which data sets (e.g., authentication history, access logs, DNS lookup and record updates, NetFlow IP traffic, DHCP logs, VPN logs, etc.) are the most critical and available for an IT security team trying to assess a security breach, and also the particular granularity of information to be combined. This may be augmented with inverse reasoning as to what data sets may have been excluded to ensure visibility into the coverage.

7. Determining what services should be offered to a customer. For example, dynamic information assembly based on suitability reasoning may be used to determine if a broker should offer 401(k) rollover and moving services to a customer. Termination notification on company 401(k) matching may have triggered the initiation of analytics to positively identify the employee separation event. The rollover offer may be presented to the employee if the customer LinkedIn profile is updated with a position at a new company, or perhaps if Facebook or Twitter feeds indicate a location change. If some of these findings match within a reasonable range of certainty, then the customer is offered the additional service. Reasoning is also possible based on whether enough data has been considered to act on a swing in customer sentiment.

8. Determining appropriate emergency supply levels for disaster readiness. For example, the semantic reasoning system may be used to determine how much water and emergency supplies stores in a city should stock in the event of an approaching hurricane to avoid shortages. Analytic models may be used to draw information from historical regional sales, availability and cost of warehouse space, point-of-sale information, and the estimated accuracy of weather prediction information. At any point of the computation, these data sets are inconsistent, but planners need a definitive prediction to execute. Assigning a degree of confidence at each processing step can mitigate data set inconsistency issues arising in the overall prediction of risk mitigation. Dynamic composition of analytical steps with criteria and rule addition makes disaster prediction modeling cost-effective and customizable to meet quickly changing conditions. There are related examples where a process leaves multiple data sets in inconsistent states, and where semantic reasoning over the data sets helps disentangle the inconsistencies.

Again, these use cases are examples only, and the semantic reasoning system 102 can be adapted for numerous other use cases. It is apparent from these use cases that embodiments of the present invention can provide a number of significant advantages relative to conventional practice.

For example, in the context of information assembly processes, which are ubiquitous and important, reasoning over data set metadata brings substantial benefits. Driven by an explicit ontological representation, this approach allows semantic expression and evaluation of many key aspects of data set inclusion and manipulation within processes, where "manipulation" as used herein in this context is intended to be broadly construed so as to encompass a wide variety of different types of processing, including, for example, updating, rendering, combining, selecting, identifying, recommending, etc. Former approaches treated data sets as containers, with minimal metadata. Embodiments of the present invention provide the opportunity to look inside these containers via metadata that describes content, structure, and classifications of the data itself, and allows use of this metadata for downstream reasoning or governance with respect to changes over time.

The evaluation of explicit assertions, constraints and rules about data sets in the context of processes can drive actions that reduce or avoid problems with these processes, and increase user confidence in process outcomes. Actions based on reasoning may be taken to preserve or reestablish constraints and assertions, to alter data set state, or to authorize or prohibit data set usage for purpose within a process. The examples given above show that reasoning over metadata describing data sets has great potential to improve the quality, flexibility, timeliness, performance, compliance, relevance to purpose, and success of the associated processes for information assembly.

It was noted above that portions of the information processing system 100 may be implemented using one or more processing platforms. Illustrative embodiments of such platforms will now be described in greater detail.

Figure 6:
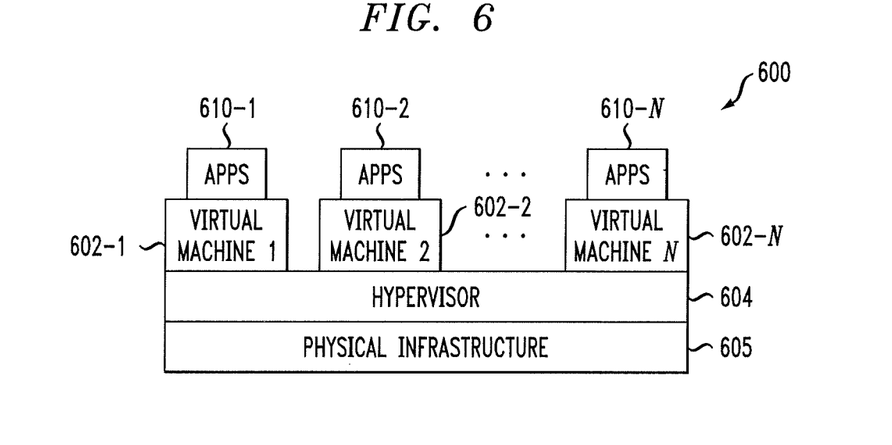
FIGS. 6 and 7 show examples of processing platforms that may be utilized to implement at least a portion of the FIG. 1 system.

As shown in FIG. 6, portions of the system 100 may comprise cloud infrastructure 600. The cloud infrastructure 600 comprises virtual machines (VMs) 602-1, 602-2, . . . 602-N implemented using a hypervisor 604. The hypervisor 604 is an example of what is more generally referred to herein as "virtualization infrastructure." The hypervisor 604 runs on physical infrastructure 605. The cloud infrastructure 600 further comprises sets of applications 610-1, 610-2, . . . 610-N running on respective ones of the virtual machines 602-1, 602-2, . . . 602-N under the control of the hypervisor 604.

Although only a single hypervisor 604 is shown in the embodiment of FIG. 6, the system 100 may of course include multiple hypervisors each providing a set of virtual machines using at least one underlying physical machine.

An example of a commercially available hypervisor platform that may be used to implement hypervisor 604 and possibly other portions of the IT infrastructure of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

Figure 7:
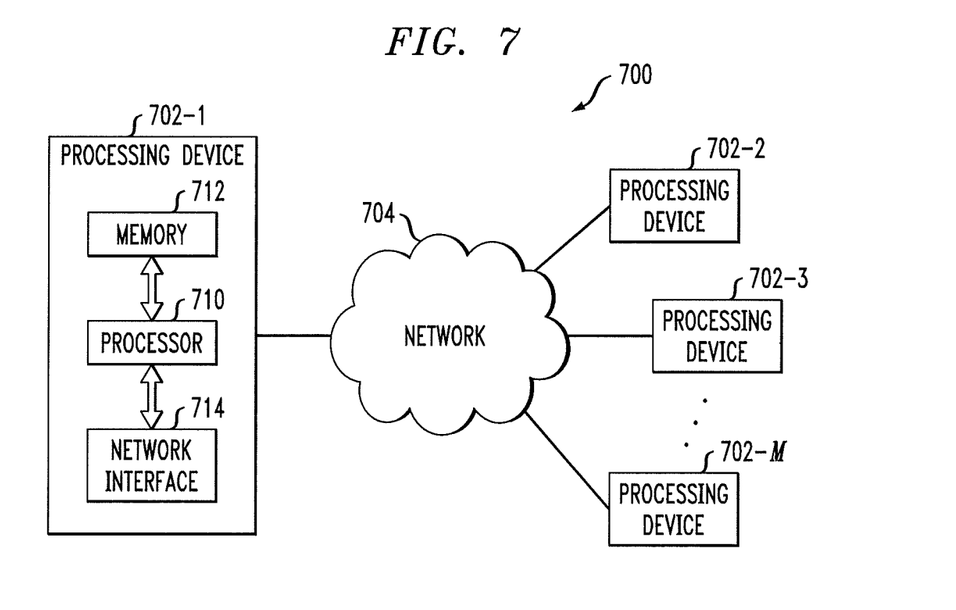

The processing platform 700 in this embodiment comprises a portion of the system 100 and includes a plurality of processing devices, denoted 702-1, 702-2, 702-3, . . . 702-M, which communicate with one another over a network 704.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. The memory 712 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the processing device 702-1 causes the device to perform functions associated with one or more of the modules or other components of system 100, such as the semantic reasoning system 102. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the processing device 702-1 is network interface circuitry 714, which is used to interface the processing device with the network 704 and other system components. Such circuitry may comprise conventional transceivers of a type well known in the art.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

As indicated previously, dynamic information assembly based on suitability reasoning over metadata as disclosed herein can be implemented at least in part in the form of one or more software programs stored in memory and executed by a processor of a processing device such as one of the virtual machines 602 or one of the processing devices 702. A memory having such program code embodied therein is an example of what is more generally referred to herein as a "computer program product."

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices and IT infrastructure arrangements. Numerous other embodiments within the scope of the appended claims will be readily apparent to those skilled in the art.

What is claimed is:

1. An apparatus comprising:
a reasoning system configured to interact with data processing elements of an information processing system;
the reasoning system comprising:
a reasoning module configured to perform one or more reasoning operations on metadata characterizing data sets associated with said data processing elements in order to identify at least selected portions of one or more of the data sets as being suitable for use in achieving a designated purpose; and
a dynamic information assembly module configured to utilize results of the one or more reasoning operations to assemble at least a subset of the selected portions so as to achieve the designated purpose;
wherein the reasoning system comprises a semantic reasoning system;
wherein the metadata characterizes the data sets in accordance with at least one specified semantic ontology comprising at least one process, at least one task associated with each process, and at least one role associated with each process, the task being subject to at least one of a rule and a constraint, and being associated with at least one agent, and the role being a role for a given one of the data sets;
wherein the reasoning module in determining suitability of the selected portions of the one or more data sets for use in achieving the designated purpose analyzes at least one of what data sets are needed and what data sets are available for the plurality of steps within the at least one process;
wherein the dynamic information assembly module is configured to manipulate the selected portions for achieving the designated purpose;
wherein the manipulation comprises at least one of:
(i) substituting a data set for an unavailable data set;
(ii) updating at least one of the data sets; and
(iii) combining at least two of the data sets; and
wherein the reasoning system is implemented using at least one processing device comprising a processor coupled to a memory.

2. The apparatus of claim 1 wherein the reasoning module in determining suitability of the selected portions of the one or more data sets for use in achieving the designated purpose generates at least one of a recommendation and forensics information regarding one or more of the selected portions.

3. The apparatus of claim 1 wherein the semantic reasoning system further comprises a metadata capture module configured to obtain the metadata characterizing the data sets associated with said data processing elements.

4. The apparatus of claim 1 wherein the specified semantic ontology comprises at least one horizontal ontology that leverages one or more vertical ontologies.

5. The apparatus of claim 1 wherein a given task has at least one of a rule and a constraint associated therewith in the specified semantic ontology.

6. The apparatus of claim 1 wherein at least a portion of the metadata is obtained utilizing one or more SPARQL queries in conjunction with performance of at least one reasoning operation.

7. The apparatus of claim 1 wherein the dynamic information assembly module utilizes at least one process to manipulate the selected portions in a manner that facilitates achievement of the designated purpose.

8. The apparatus of claim 1 wherein at least a subset of the data processing elements comprise processing devices of a processing platform of the information processing system.

9. The apparatus of claim 1 wherein the metadata characterizes properties of and relationships among the data sets, and relationships among processes, tasks, roles, agents and the data sets.

10. The apparatus of claim 9 wherein the characterization by the metadata of the properties of and the relationships among the data sets, and of the relationships among the processes, the tasks, the roles, the agents and the data sets is defined in accordance with the at least one specified semantic ontology.

11. The apparatus of claim 1 wherein the reasoning module in determining suitability of the selected portions of the one or more data sets for use in achieving the designated purpose further analyzes whether the selected portions meet at least one of a rule and a constraint for the at least one process.

12. The apparatus of claim 1 wherein an algorithm for use in achieving the designated purpose is selected based at least in part on the substituted data set.

13. An apparatus comprising:
a reasoning system configured to interact with data processing elements of an information processing system;
the reasoning system comprising:
a reasoning module configured to perform one or more reasoning operations on metadata characterizing data sets associated with said data processing elements in order to identify at least selected portions of one or more of the data sets as being suitable for use in achieving a designated purpose; and
a dynamic information assembly module configured to utilize results of the one or more reasoning operations to assemble at least a subset of the selected portions so as to achieve the designated purpose;
wherein the reasoning module is configured to determine at least one process, to identify a plurality of tasks associated with the process, with each such task being subject to at least one of a rule and a constraint, and being associated with at least one agent, and to identify a plurality of roles associated with the process, wherein each such role is played by a corresponding one of the selected portions of the one or more data sets;
wherein the reasoning module in determining suitability of the selected portions of the one or more data sets for use in achieving the designated purpose analyzes at least one of what data sets are needed and what data sets are available for the at least one process;
wherein the dynamic information assembly module is configured to manipulate the selected portions for achieving the designated purpose;
wherein the manipulation comprises at least one of:
(i) substituting a data set for an unavailable data set;
(ii) updating at least one of the data sets; and
(iii) combining at least two of the data sets; and
wherein the reasoning system is implemented using at least one processing device comprising a processor coupled to a memory.

14. A method comprising the steps of:
performing one or more reasoning operations on metadata characterizing data sets associated with data processing elements of an information processing system in order to identify at least selected portions of one or more of the data sets as being suitable for use in achieving a designated purpose; and
utilizing results of the one or more reasoning operations to assemble at least a subset of the selected portions so as to achieve the designated purpose;
wherein the metadata characterizes the data sets in accordance with at least one specified semantic ontology comprising at least one process, at least one task associated with each process, and at least one role associated with each process, the task being subject to at least one of a rule and a constraint, and being associated with at least one agent, and the role being a role for a given one of the data sets;
wherein identifying the selected portions of the one or more data sets as being suitable for use in achieving the designated purpose comprises analyzing at least one of what data sets are needed and what data sets are available for the at least one process;
wherein the utilizing step comprises manipulating the selected portions for achieving the designated purpose;
wherein the manipulating comprises at least one of:
(i) substituting a data set for an unavailable data set;
(ii) updating at least one of the data sets; and
(iii) combining at least two of the data sets; and
wherein the steps are performed by at least one processing device comprising a processor coupled to a memory.

15. The method of claim 14 wherein the utilizing step comprises utilizing at least one process to manipulate the selected portions in a manner that facilitates achievement of the designated purpose.

16. The method of claim 14 further comprising the step of capturing the metadata characterizing the data sets associated with the data processing elements.

17. The method of claim 14 wherein at least a portion of the metadata is obtained utilizing one or more SPARQL queries in conjunction with performance of at least one reasoning operation.

18. A computer program product comprising a non-transitory processor-readable storage medium having encoded therein executable code of one or more software programs, wherein the one or more software programs when executed by the processor of the processing device implement the steps of the method of claim 14.

19. The method of claim 14 wherein the metadata characterizes properties of and relationships among the data sets, and relationships among processes, tasks, roles, agents and the data sets.

20. The method of claim 14 wherein identifying the selected portions of the one or more data sets as being suitable for use in achieving the designated purpose further comprises analyzing whether the selected portions meet at least one of a rule and a constraint for the at least one process.

21. The method of claim 14 wherein an algorithm for use in achieving the designated purpose is selected based at least in part on the substituted data set.

22. A method comprising the steps of:
performing one or more reasoning operations on metadata characterizing data sets associated with data processing elements of an information processing system in order to identify at least selected portions of one or more of the data sets as being suitable for use in achieving a designated purpose; and
utilizing results of the one or more reasoning operations to assemble at least a subset of the selected portions so as to achieve the designated purpose;

wherein the performing step further comprises:
determining at least one process;
identifying a plurality of tasks associated with the process, with each such task being subject to at least one of a rule and a constraint, and being associated with at least one agent;
identifying a plurality of roles associated with the process, wherein each such role is played by a corresponding one of the selected portions of the one or more data sets; and
analyzing at least one of what data sets are needed and what data sets are available for the process;
wherein the utilizing step comprises manipulating the selected portions for achieving the designated purpose;
wherein the manipulation comprises at least one of:
(i) substituting a data set for an unavailable data set;
(ii) updating at least one of the data sets; and
(iii) combining at least two of the data sets; and
wherein the steps are performed by at least one processing device comprising a processor coupled to a memory.

* * * * *